United States Patent [19]
Murata et al.

[11] Patent Number: 5,311,340
[45] Date of Patent: May 10, 1994

[54] LIQUID CRYSTAL DISPLAY DEVICE HAVING COMPENSATOR AND THIN FILM WITH MAXIMUM REFRACTIVE INDEX PARALLEL AND PERPENDICULAR TO COMPENSATOR, RESPECTIVELY

[75] Inventors: Makoto Murata, Kobe; Eiichi Yoshida, Akashi; Akihiko Nakajima, Himeji, all of Japan

[73] Assignee: Kanegafuchi Kagaku Kogyo Kabushiki Kaisha, Osaka, Japan

[21] Appl. No.: 51,200

[22] Filed: Apr. 22, 1993

[30] Foreign Application Priority Data

Apr. 27, 1992 [JP] Japan .................................. 4-107804
Apr. 28, 1992 [JP] Japan .................................. 4-110089
Jun. 26, 1992 [JP] Japan .................................. 4-169032

[51] Int. Cl.$^5$ .................... G02F 1/1333; G02F 1/1335
[52] U.S. Cl. ............................................ 359/73; 359/74
[58] Field of Search ........................................ 359/73, 74

[56] References Cited

U.S. PATENT DOCUMENTS

| | | | |
|---|---|---|---|
| 5,138,474 | 8/1992 | Arakawa | 359/73 |
| 5,184,236 | 2/1993 | Miyashita et al. | 359/73 |
| 5,212,819 | 5/1993 | Wada | 359/73 |
| 5,227,903 | 7/1993 | Miyazawa et al. | 359/73 |
| 5,235,450 | 8/1993 | Yoshimura et al. | 359/73 |

FOREIGN PATENT DOCUMENTS

| | | | |
|---|---|---|---|
| 2-253230 | 10/1990 | Japan | 359/73 |
| 2-285324 | 11/1990 | Japan | 359/73 |
| 2-308128 | 12/1990 | Japan | 359/73 |

OTHER PUBLICATIONS

Suguru Yamamoto et al., "Retardation Film for LCD," in Nitto Giho, vol. 28, No. 2, pp. 105–113 (Oct. 1990).

*Primary Examiner*—Anita P. Gross
*Attorney, Agent, or Firm*—Varndell Legal Group

[57] ABSTRACT

Disclosed is a liquid crystal display device including a liquid crystal cell in which a twisted nematic liquid crystal is interposed between a pair of transparent electrodes disposed opposite to each other, a pair of polarizers, an optically compensating element having a maximum refractive index in a direction in the plane thereof, and a thin film having a maximum refractive index in the direction of the thickenss thereof, the optically compensating element and the thin film being interposed between the liquid crystal cell and the polarizer so as to substantially satisfy specific conditions. This liquid crystal display device offers an improved viewing angle and is advantageously used in a black and white liquid crystal display.

5 Claims, 2 Drawing Sheets

LIQUID CRYSTAL DISPLAY DEVICE HAVING COMPENSATOR AND THIN FILM WITH MAXIMUM REFRACTIVE INDEX PARALLEL AND PERPENDICULAR TO COMPENSATOR, RESPECTIVELY

BACKGROUND OF THE INVENTION

The present invention relates to a liquid crystal display device. Particularly, it relates to a liquid crystal display device having an improved viewing angle.

In recent years, liquid crystal display panels have found use in increasing applications. Quite recently, a black and white STN (Super Twisted Nematic) liquid crystal display panel has been developed.

In the case of this display panel, coloration is caused by birefringence inherent to a liquid crystal material. The coloration is removed by compensating for the birefringence with an optical phase retarder interposed between a liquid crystal cell and a polarizer.

As the method for compensating for the birefringence, there have been proposed a method wherein as an optical phase retarder a STN liquid crystal cell is used which is identical with a liquid crystal cell to be driven, a method wherein as an optical phase retarder an optically anisotropic oriented film made of a polycarbonate resin or polyvinyl alcohol resin of which inherent birefringence is the same in sign, or plus, as that of the STN liquid crystal cell, and a like method. With the latter in particular, the liquid crystal display panel (FTN liquid crystal display panel) is reduced in weight and the light transmittance thereof is improved. Further, there has also been proposed a liquid crystal display panel which uses an optical phase retarder in which two or more optically anisotropic oriented films of polycarbonate resin or polyvinyl alcohol resin of which inherent birefringence value assumes plus are superimposed one on the other so that the longitudinal axes of refractive index ellipses in the respective plains thereof would cross each other.

However, the use of only the optically anisotropic oriented film imparted with birefringence in the plane thereof by stretching or the like cannot achieve a proper compensation in oblique directions. This results in coloration and a narrow viewing angle.

Alternatively, there has recently been reported that increasing the refractive index of an optically anisotropic oriented film in the direction of the thickness thereof widens the range of proper compensation in oblique directions and, hence, widens the viewing angle (refer to NITTO GIHO, Vol. 28, No. 2, pp. 105 to 113, 1990). However, this literature only teaches the conditional expression:

$$(n_x+n_y)/2 = n_z$$

and, in addtion, there is a limitation that this conditional expression holds true on the assumption:

$$n_x \simeq n_y \simeq n_z.$$

Consequently, this involves a problem that an optical compensator can be designed only on the basis of limited materials and limited combinations of optically anisotropic oriented films.

It is an object of the present invention to overcome the foregoing problems involved in the conventional methods and to provide a liquid crystal display device offering a wide viewing angle.

This and other objects of the invention will become apparent from the description hereinafter.

SUMMARY OF THE INVENTION

The present inventors have conducted intensive examinations so as to overcome the foregoing problems and have found the fact that it is possible to widen the viewing angle by interposing between a liquid crystal cell and a polarizer an optically compensating element having a maximum refractive index in a direction in the plane thereof and a thin film having a maximum refractive index in the direction of the thickness thereof, the optically compensating element and the thin film being designed and combined with each other so as to substantially satisfy specific conditions. Since such specific conditions are applicable to any film of any material, the phase retarder can be designed with fewer limitations.

According to the present invention, there is provided a liquid crystal display device comprising a liquid crystal cell including a twisted nematic liquid crystal material sandwiched between a pair of transparent electrodes disposed opposite to each other, a pair of polarizers disposed respectively on both sides of the liquid crystal cell, an optically compensating element having a maximum refractive index in a direction in the plane thereof, and a thin film having a maximum refractive index in the direction of the thickness thereof, the optically compensating element and the thin film being interposed between the liquid crystal cell and at least one of the polarizers and substantially satisfying the formula (I):

$$\frac{\Delta n}{n^2} \times d = \frac{2 \times \Delta N}{N^2} \times D - \frac{3 \times (\Delta N)^2}{N^2 \times (N_Z)^2} \times D \quad (I)$$

$$N_X = N_Y, n_y = n_z$$

where n represents the average refractive index of the optically compensating element; $n_x$, $n_y$ and $n_z$ represent the refractive indexes of the optically compensating element on respective coordinate axes thereof, respectively; d represents the thickness of the optically compensating element; $\Delta n = n_x - n_y$; N represents the average refractive index of the thin film; $N_x$, $N_y$ and $N_z$ represent the refractive indexes of the thin film on respective coordinate axes thereof, respectively; D represents the thickness of the thin film; $\Delta N = N_z - N_x$; subscripts x, y and z for n respectively represent an axis along which the optically compensating element has the maximum refractive index, an axis cross the axis x at right angles in the plane of the optically compensating element, and an axis which extends in the direction of the thickness of the optically compensating element; subscripts X, Y and Z for N respectively represent an axis in the plane of the thin film, an axis crossing the axis X at right angles in the plane of the thin film, and an axis which extends in the direction of the thickness of the thin film and along which the thin film has the maximum refractive index; and the axes X, Y and Z respectively extend in the same directions as the axes x, y and z do.

In the liquid crystal display device according to the present invention, interposed between the liquid crystal cell and the polarizer are the optically compensating element having a maximum refractive index in a direction in the plane thereof and the thin film having a maximum refractive index in the direction of the thickness thereof; and the optically compensating element and the thin film substantially satisfies the conditions represented by the formula (I). Consequently, it is possible to make constant the phase difference due to birefringence resulting from the combination of the optically compensating element and the thin film within a large viewing angle. Hence, the problem caused by the birefringence inherent to a liquid crystal can be compensated for. As a result, coloration due to the birefringence of a liquid crystal can be suppressed while the viewing angle is widened.

DETAILED DESCRIPTION

Figure 1:
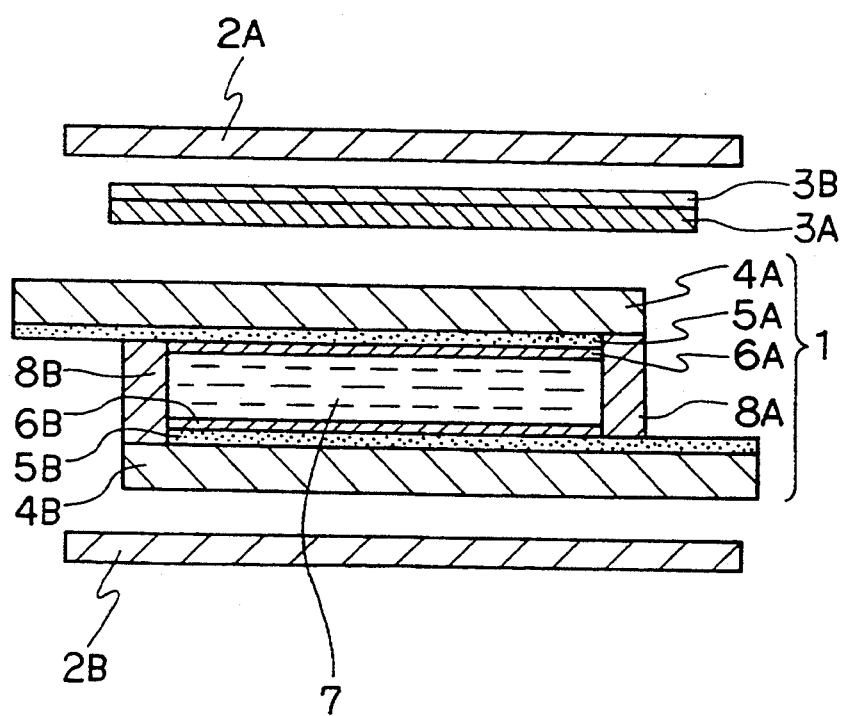
FIG. 1 is a schematic sectional view showing an embodiment of the liquid crystal display device according to the present invention.

The present invention is directed to a liquid crystal display device of the type comprising a liquid crystal cell in which a twisted nematic liquid crystal material is sandwiched between a pair of transparent electrodes disposed opposite to each other, and a pair of polarizers provided respectively on both sides of the liquid crystal cell. Particularly, the invention is directed to a STN liquid crystal display device.

As the liquid crystal cell, conventionally known ones can be utilized without particular limitations. A representative example of such liquid crystal cells is of the type wherein a twisted nematic liquid crystal material is sandwiched between a pair of transparent substrates of a glass or a resin which are disposed opposite to each other. On the inner surface of each transparent substrate is disposed a transparent electrode, such as an ITO film, on which an orientation film is provided.

The orientation film is formed from a resin such as polyimide or polyamide or from an inorganic material such as silicon oxide or titanium oxide. The orientation film is rubbed, or formed by vapor deposition so as to allow easy orientation of liquid crystal molecules.

There is no particular limitation to the material of the nematic liquid crystal. Also, there is no particular limitation to the space between the transparent substrates sandwiching the liquid crystal. However, the transparent substrates are spaced usually about 10 to about 3 μm, preferably about 8 to about 4 μm apart from each other.

As the polarizer, usually used is a uniaxially stretched polyvinyl alcohol resin film or sheet on which iodine is adsorbed. However, the polarizer is not limited to this.

In the present invention, between the liquid crystal cell and the polarizer are interposed an optically compensating element having a maximum refractive index in a direction in the plane thereof and a thin film having a maximum refractive index in the direction of the thickness thereof. The optically compensating element may be a polymer film which is stretched so as to have a maximum refractive index in a direction in the plane thereof, a liquid crystal cell, or a plate fabricated by cutting a crystalline material having optical anisotropy. If the polymer film is used as the optically compensating element, it is a general practice that a raw polymer material is formed into a film by casting or a like method, which film is then uniaxially or biaxially stretched so as to have a maximum refractive index in a direction in the plane thereof.

Favorable examples of the polymer material include aromatic polymers such as polyester, polycarbonate, polyarylate, polyether ether ketone, polysulfone and polyether sulfone; polyolefin polymers such as polyethylene and polypropylene; vinyl polymers such as polyvinylidene chloride, polyvinyl alcohol, polystyrene and acrylic resins; and celluloses and their derivatives such as regenerated celluloses, diacetyl cellulose and triacetyl cellulose.

On the other hand, the thin film having a maximum refractive index in the direction of the thickness thereof is usually formed from an inorganic material having birefringence such as zircon, rutile and silicon carbide, or from a low or high molecular-weight material exhibiting liquid crystallinity. As required, there may be used an optically isotropic substrate for supporting the thin film.

Examples of the high molecular-weight material exhibiting liquid crystallinity include polymers in which a group exhibiting liquid crystallinity under specific conditions is introduced as a side chain. Examples of the polymers in which the group exhibiting liquid crystallinity is to be introduced are aromatic polymers such as polyester, polycarbonate, polyarylate, polyether ether ketone, polysulfone and polyether sulfone; polyolefin polymers such as polyethylene and polypropylene; vinyl polymers such as polyvinylidene chloride, polyvinyl alcohol, polystyrene and acrylic resins; and celluloses and their derivatives such as regenerated celluloses, diacetyl cellulose and triacetyl cellulose.

In the liquid crystal display device according to the present invention, the optically compensating element having a maximum refractive index in a direction in the plane thereof and the thin film having a maximum refractive index in the direction of the thickness thereof are inserted between the liquid crystal cell and the polarizer so as to substantially satisfy the formula (I):

$$\frac{\Delta n}{n^2} \times d = \frac{2 \times \Delta N}{N^2} \times D - \frac{3 \times (\Delta N)^2}{N^2 \times (N_Z)^2} \times D \qquad (I)$$

$$N_X \simeq N_Y, \ n_y \simeq n_z$$

where n represents the average refractive index of the optically compensating element; $n_x$, $n_y$ and $n_z$ represent the refractive indexes of the optically compensating element on respective coordinate axes thereof, respectively; d represents the thickness of the optically compensating element; $\Delta n = n_x - n_y$; N represents the average refractive index of the thin film; $N_X$, $N_Y$ and $N_Z$ represent the refractive indexes of the thin film on respective coordinate axes thereof, respectively; D represents the thickness of the thin film; $\Delta N = N_Z - N_X$; subscripts x, y and z for n respectively represent an axis along which the optically compensating element has the maximum refractive index, an axis crossing the axis x at right angles in the plane of the optically compensating element, and an axis which extends in the direction of the thickness of the optically compensating element; subscripts X, Y and Z for N respectively represent an axis in the plane of the thin film, an axis crossing the axis X at right angles in the plane of the thin film, and an axis which extends in the direction of the thickness of the thin film and along which the thin film has the maximum refractive index; and the axes X, Y and Z respectively extend in the same directions as the axes x, y and z do.

To substantially satisfy the formula (I) is herein meant to satisfy the range: (the value of the left side of the formula (I))×0.9<(the value of the right side of the formula (I))<(the value of the left side of the formula (I))×1.1.

Details are determined depending on the characteristics of the optically compensating element and thin film to be fabricated and a required viewing angle of the intended liquid crystal cell.

As described above, the optically compensating element having a maximum refractive index in a direction in the plane thereof and the thin film having a maximum refractive index in the direction of the thickness thereof are combined so as to substantially satisfy the relation of the formula (I). Hence, it becomes possible to make constant within a large viewing angle the phase difference due to birefringence resulting from the combination of the optically compensating element and the thin film. This results in a widened viewing angle.

In the present invention the optically compensating element and the thin film are combined together in various modes and, hence, there can be offered different embodiments of the liquid crystal display device. For example, in the case of transmission-type liquid crystal display device, two polarizers are used. In this case the optically compensating element and the thin film can be disposed on the same side or on opposite sides respectively, relative to the liquid crystal cell. Further, the thin film can be disposed on the surface of the optically compensating element or on the surface of the substrate of the liquid crystal cell which surface is on the side adjacent one of the polarizers. Otherwise, it is possible to use the optically compensating element provided with the thin film as the substrate of the liquid crystal cell. Further, there can be used a plurality of optically compensating elements of different type and/or a plurality of thin films of different type having a maximum refractive index in the direction of the thickness thereof. In this case, a plurality of optically compensating elements can be disposed so that a portion thereof is interposed between one polarizer and the cell while the rest thereof between the other polarizer and the cell. Even if either or both of the optically compensating element and the thin film are used in plural, it is possible to set the conditions according to a conditional expression identical to the formula (I). The optically compensating element and/or the thin film can also serve as a part of another element, for example, as a protective film or sheet for the polarizer.

Although the present invention is particularly suitable for a STN (Super-Twisted Nematic) liquid crystal display device, it is applicable to a TN (Twisted Nematic) liquid crystal display device of which twist angle is 90°.

It should be noted that the angle at which the optical compensating element and the thin film are disposed with respect to the polarizer and the liquid crystal cell can be determined by an optimization operation known in the art such as JONES matrix method, based on the characteristics of the liquid crystal cell.

Hereinafter, representative embodiments of the present invention will be described with reference to the drawings.

FIG. 1 is a sectional view showing a preferred embodiment of the liquid crystal display device for use in a black and white STN liquid crystal display panel, according to the present invention.

Referring to FIG. 1, numeral 1 denotes a nematic liquid crystal cell in which liquid crystal molecules are twisted, the cell comprising a pair of transparent substrates 4A and 4B and spacers 8A and 8B. On the inner surfaces of the substrates 4A and 4B are provided transparent electrodes 5A and 5B respectively, on which orientation films 6A and 6B are disposed respectively. Between the orientation films 6A and 6B is provided a nematic liquid crystal material 7.

The liquid crystal cell 1 is interposed between a pair of polarizers 2A and 2B disposed in parallel opposite to each other. Between the polarizer 2A and the transparent substrate 4A constituting the liquid crystal cell 1 is interposed an optical compensating element 3A having a maximum refractive index in a direction in the plane thereof. On the surface of the optical compensating element 3A is provided a thin film 3B having a maximum refractive index in the direction of the thickness thereof. The thin film is provided on either or both sides of the optical compensating element.

Figure 2:
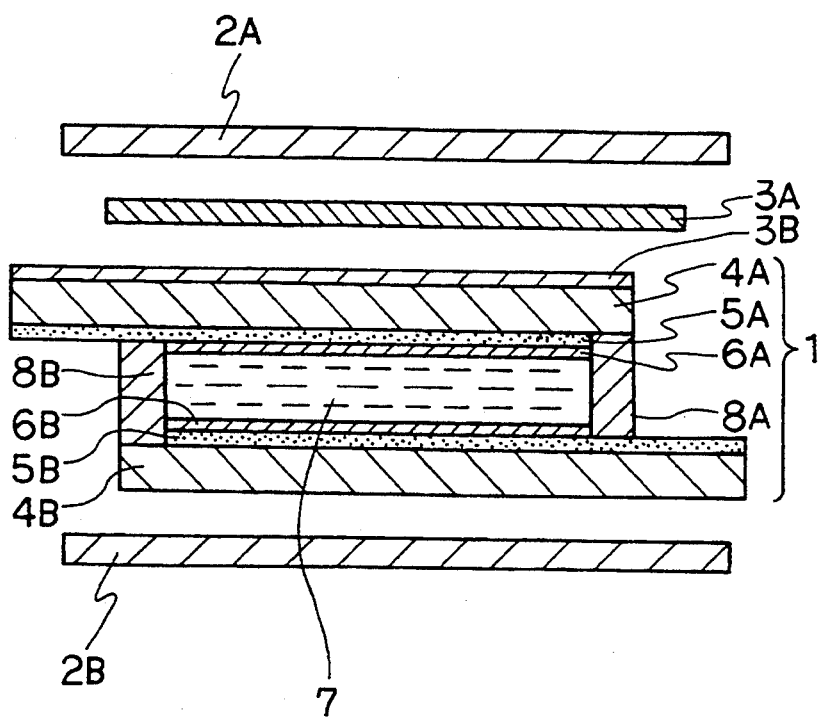
FIG. 2 is a schematic sectional view showing another embodiment of the liquid crystal display device according to the present invention.

The liquid crystal display device according to the present invention can be constituted as shown in FIG. 2 as a second embodiment.

Referring to FIG. 2, the thin film 3B is provided on the surface of the transparent substrate 4A, and the optical compensating element 3A is interposed between the polarizer 2A and the liquid crystal cell 1. This embodiment is particularly preferable where the the thin film needs to be formed at a very high temperature, for example, 500° C.

The liquid crystal display device according to the present invention can assume various forms as well as those shown in FIGS. 1 and 2.

The present invention will be described more specifically by way of Examples. It is to be understood that the present invention is not limited to the Examples, and various change and modifications may be made in the invention without departing from the spirit and scope thereof.

EXAMPLE 1

An unstretched polyarylate film (commercially available under the name "F-1100" from KANEGAFUCHI KAGAKU KOGYO KABUSHIKI KAISHA) was uniaxially stretched at 250° C. to give an optically anisotroic oriented film having an optical-path difference of 230 nm and a thickness of 100 μm as an optically compensating element. A thin film of silicon carbide was deposited to have a thickness of 7.6 μm on the optically anisotropic oriented film by a CVD method. The resulting silicon carbide thin film had a maximum refractive index in the direction of the thickness thereof, and the value of birefringence (ΔN) thereof was 0.043. The values n, $n_x$, $n_y$, $n_z$, Δn and d of the optical compensating element made of polyarylate were 1.59, 1.5915, 1.5892, 1.5892, 0.0023 and 100 μm, respectively. The values N, $N_X$, $N_Y$, $N_Z$, ΔN and D of the silicon carbide thin film were 2.68, 2.666, 2.666, 2.709, 0.043 and 7.6 μm, respectively.

Assembled together were a polarizer, a STN liquid crystal cell of which the optical-path difference was 800 nm and the twist angle was 240°, the optically compensating element of polyarylate formed on its surface with the silicon carbide thin film, and another polarizer which was positioned to cross the former so that the two polarizers would form a crossed nicol, to construct a liquid crystal display device of which display is dark in OFF state for use in a black and white STN liquid crystal panel.

With regard to the thus constructed liquid crystal display device in OFF state, variation in darkness of the display at different viewing angles was observed to evaluate the viewing angle characteristic. No variation in darkness was recognized until a viewing angle of 30°. Thus, the viewing angle characteristic of the device was good.

It should be noted that the value of the left side and that of the right side of the formula (I) are substantially equal to each other.

COMPARATIVE EXAMPLE 1

A liquid crystal display device for use in a black and white STN liquid crystal display panel was constructed in the same manner as in Example 1 except that the same optically anisotropic oriented film of polyarylate as produced in Example 1 was used as it was without forming the silicon carbide thin film thereon. The thus constructed liquid crystal display device was evaluated for its viewing angle characteristic. As a result, an occurrence of variation in darkness was recognized at a viewing angle of 20° and, hence, the device was inferior in viewing angle characteristic.

EXAMPLE 2

In the liquid crystal display device constructed in Comparative Example 1 for use in a white and black STN liquid crystal display panel, a 1.2 μm-thick thin film of rutile was formed on one of the opposite glass substrates of the STN liquid crystal cell by an EB deposition method. The resulting rutile thin film had a maximum refractive index in the direction of the thickness thereof and a birefringence ($\Delta N$) of 0.29. The values N, $N_X$, $N_Y$, $N_Z$, $\Delta N$ and D were 2.71, 2.61, 2.61, 2.90, 0.29 and 1.2 μm, respectively.

With regard to the thus constructed liquid crystal display device in OFF state, variation in darkness of the display thereof at different viewing angles was observed to evaluate the viewing angle characteristic. As a result, no variation in darkness was recognized until a viewing angle of 30°. Thus, the viewing angle characteristic of the device was good like the device constructed in Example 1.

It should be noted that the value of the left side and that of the right side in the formula (I) were substantially equal to each other.

EXAMPLE 3

On the surface of the same optically anisotropic oriented film of polyarylate as produced in Example 1 was casted a polymer composed of a recurring unit having a group which exhibits liquid crystallinity, represented by the formula:

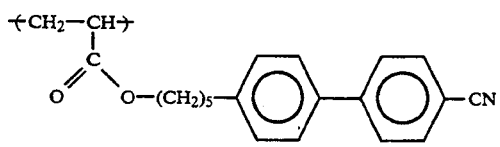

to form a thin film of 23 μm thickness. The resulting thin film of such a side chain-type polymer liquid crystal had a maximum refractive index in the direction of the thickness thereof, and the value of birefringence ($\Delta N$) thereof was 0.005. The values N, $N_X$, $N_Y$, $N_Z$, $\Delta N$ and D of the thin film were 1.532, 1.530, 1.530, 1.535, 0.005 and 23 μm, respectively.

Assembled together were a polarizer, a STN liquid crystal cell of which the optical-path difference was 800 nm and the twist angle was 240°, the optically anisotropic oriented film of polyarylate, as the optically compensating element, formed on its surface with the polymer liquid crystal thin film, and another polarizer which was positioned to cross the former so that the two polarizers would form a crossed nicol, to construct a liquid crystal display device of which display is dark in OFF state for use in a black and white STN liquid crystal panel.

With regard to the thus constructed liquid crystal display device in OFF state, variation in darkness of the display at different viewing angles was observed to evaluate the viewing angle characteristic. No variation in darkness was recognized until a viewing angle of 30°. Thus, the viewing angle characteristic of the device was good.

It should be noted that the value of the left side and that of the right side of the formula (I) are substantially equal to each other.

As has been described, the present invention provides a liquid crystal display device of which viewing angle characteristic is significantly improved by combining an optically compensating element which has a maximum refractive index in a direction in the plane thereof with a thin film which has a maximum refractive index in the direction of the thickness thereof so as to substantially satisfying the specific conditions. This liquid crystal display device is advantageously used in a black and white liquid crystal display, and the like.

In addition to the materials and elements used in the Examples, other materials and elements can be used in the Examples as set forth in the specification to obtain substantially the same results.

What is claimed is:

1. A liquid crystal display device comprising a liquid crystal cell including a twisted nematic liquid crystal material sandwiched between a pair of transparent electrodes disposed opposite to each other, a pair of polarizers disposed respectively on both sides of the liquid crystal cell, an optically compensating element having a maximum refractive index in a direction in the plane thereof, and a thin film having a maximum refractive index in the direction of the thickness thereof, the optically compensating element and the thin film being interposed between the liquid crystal cell and at least one of the polarizers and substantially satisfying the formula (I):

$$\frac{\Delta n}{n^2} \times d = \frac{2 \times \Delta N}{N^2} \times D - \frac{3 \times (\Delta N)^2}{N^2 \times (N_Z)^2} \times D \quad (I)$$

$$N_X \simeq N_Y, n_y \simeq n_z$$

where n represents the average refractive index of the optically compensating element; $n_x$, $n_y$ and $n_z$ represent the refractive indexes of the optically compensating element on respective coordinate axes thereof, respectively; d represents the thickness of the optically compensating element; $\Delta n = n_x - n_y$; N represents the average refractive index of the thin film; $N_X$, $N_Y$ and $N_Z$ represent the refractive indexes of the thin film on respective coordinate axes thereof, respectively; D represents the thickness of the thin film; $\Delta N = N_Z - N_X$; subscripts x, y and z for n respectively represent an axis along which the optically compensating element has the maximum refractive index, an axis crossing the axis x at right angles in the plane of the optically compensating element, and an axis which extends in the direction of the thickness of the optically compensating element; subscripts X, Y and Z for N respectively represent an axis in the plane of the thin film, an axis crossing the axis X at right angles in the plane of the thin film, and an axis which extends in the direction of the thickness of the thin film and along which the thin film has the maximum refractive index; and the axes X, Y and Z respectively extend in the same directions as the axes x, y and z do.

2. The liquid crystal display device of claim 1, wherein said thin film is formed on a surface of said optically compensating element.

3. The liquid crystal display device of claim 1, wherein said thin film is formed on a surface of a substrate constituting said liquid crystal cell which surface is on the side adjacent one of said polarizers.

4. The liquid crystal display device of claim 1, wherein said thin film is made of an inorganic material.

5. The liquid crystal display device of claim 1, wherein said thin film is made of a polymer material having a group exhibiting liquid crystallinity in a side chain thereof.

* * * * *